US011545146B2

(12) United States Patent
Ren et al.

(10) Patent No.: US 11,545,146 B2
(45) Date of Patent: Jan. 3, 2023

(54) TECHNIQUES FOR LANGUAGE INDEPENDENT WAKE-UP WORD DETECTION

(71) Applicant: CERENCE OPERATING COMPANY, Burlington, MA (US)

(72) Inventors: Xiao-Lin Ren, Shanghai (CN); Jianzhong Teng, Shanghai (CN)

(73) Assignee: Cerence Operating Company, Burlington, MA (US)

( * ) Notice: Subject to any disclaimer, the term of this patent is extended or adjusted under 35 U.S.C. 154(b) by 355 days.

(21) Appl. No.: 16/348,689

(22) PCT Filed: Nov. 10, 2016

(86) PCT No.: PCT/CN2016/105343
§ 371 (c)(1),
(2) Date: May 9, 2019

(87) PCT Pub. No.: WO2018/086033
PCT Pub. Date: May 17, 2018

(65) Prior Publication Data
US 2019/0287526 A1   Sep. 19, 2019

(51) Int. Cl.
 *G10L 15/22* (2006.01)
 *G10L 15/00* (2013.01)
 (Continued)

(52) U.S. Cl.
 CPC ............ *G10L 15/22* (2013.01); *G10L 15/005* (2013.01); *G10L 15/02* (2013.01); *G10L 15/08* (2013.01);
 (Continued)

(58) Field of Classification Search
 USPC ........................................................ 704/254
 See application file for complete search history.

(56) References Cited

U.S. PATENT DOCUMENTS

| 5,428,707 A | 6/1995 | Gould et al. |
| 5,774,859 A | 6/1998 | Houser et al. |

(Continued)

FOREIGN PATENT DOCUMENTS

| CN | 101650943 A | 2/2010 |
| CN | 103021409 A | 4/2013 |

(Continued)

OTHER PUBLICATIONS

International Search Report dated Sep. 21, 2017 from corresponding International Application No. PCT/CN2016/105343, 5 pages.
(Continued)

*Primary Examiner* — Thuykhanh Le
(74) *Attorney, Agent, or Firm* — Brooks Kushman P.C.

(57) ABSTRACT

A user device configured to perform wake-up word detection in a target language. The user device comprises at least one microphone (430) configured to obtain acoustic information from the environment of the user device, at least one computer readable medium (435) storing an acoustic model (150) trained on a corpus of training data (105) in a source language different than the target language, and storing a first sequence of speech units obtained by providing acoustic features (110) derived from audio comprising the user speaking a wake-up word in the target language to the acoustic model (150), and at least one processor (415,425) coupled to the at least one computer readable medium (435) and programmed to perform receiving, from the at least one microphone (430), acoustic input from the user speaking in the target language while the user device is operating in a low-power mode, applying acoustic features derived from the acoustic input to the acoustic model (150) to obtain a second sequence of speech units corresponding to the acoustic input, determining if the user spoke the wake-up word at least in part by comparing the first sequence of speech units (Continued)

to the second sequence of speech units, and exiting the low-power mode if it is determined that the user spoke the wake-up word.

13 Claims, 5 Drawing Sheets

(51) Int. Cl.
    *G10L 15/02*           (2006.01)
    *G10L 15/08*           (2006.01)
    *G10L 15/18*           (2013.01)

(52) U.S. Cl.
    CPC .......... *G10L 15/18* (2013.01); *G10L 15/1815* (2013.01); *G10L 2015/025* (2013.01); *G10L 2015/088* (2013.01); *G10L 2015/223* (2013.01); *G10L 2015/228* (2013.01)

(56) References Cited

U.S. PATENT DOCUMENTS

| | | | |
|---|---|---|---|
| 5,802,305 A | 9/1998 | McKaughan et al. | |
| 5,983,186 A | 11/1999 | Miyazawa et al. | |
| 6,006,175 A | 12/1999 | Holzrichter | |
| 6,070,140 A | 5/2000 | Tran | |
| 6,092,043 A | 7/2000 | Squires et al. | |
| 6,397,186 B1 | 5/2002 | Bush et al. | |
| 6,408,396 B1 | 6/2002 | Forbes | |
| 6,411,926 B1 | 6/2002 | Chang | |
| 6,449,496 B1 | 9/2002 | Beith et al. | |
| 6,594,630 B1 | 7/2003 | Zlokarnik et al. | |
| 6,756,700 B2 | 6/2004 | Zeng | |
| 6,859,776 B1 | 2/2005 | Cohen et al. | |
| 6,941,265 B2 | 9/2005 | Bi et al. | |
| 6,965,786 B2 | 11/2005 | Qu et al. | |
| 7,114,090 B2 | 9/2006 | Kardach et al. | |
| 7,567,827 B2 | 7/2009 | Kim | |
| 7,574,361 B2 | 8/2009 | Yeager et al. | |
| 7,720,683 B1 | 5/2010 | Vermeulen et al. | |
| 7,774,204 B2 | 8/2010 | Mozer et al. | |
| 8,056,070 B2 | 11/2011 | Goller et al. | |
| 8,181,046 B2 | 5/2012 | Marcu et al. | |
| 8,190,420 B2 | 5/2012 | Kadirkamanathan et al. | |
| 8,229,729 B2* | 7/2012 | Sarikaya | G06F 40/44 |
| | | | 704/250 |
| 8,285,545 B2 | 10/2012 | Lee et al. | |
| 8,311,824 B2* | 11/2012 | Lubowich | G10L 15/005 |
| | | | 704/277 |
| 8,515,750 B1* | 8/2013 | Lei | G10L 15/26 |
| | | | 704/235 |
| 8,548,176 B2 | 10/2013 | Bright | |
| 8,620,389 B2 | 12/2013 | Schrager | |
| 8,666,751 B2 | 3/2014 | Murthi et al. | |
| 8,949,130 B2* | 2/2015 | Phillips | G10L 15/30 |
| | | | 704/235 |
| 8,977,255 B2 | 3/2015 | Freeman et al. | |
| 9,087,520 B1 | 7/2015 | Salvador | |
| 9,112,984 B2 | 8/2015 | Sejnoha et al. | |
| 9,293,151 B2 | 3/2016 | Herbig et al. | |
| 9,361,084 B1* | 6/2016 | Costa | G10L 15/22 |
| 9,361,885 B2 | 6/2016 | Ganong, III et al. | |
| 9,390,708 B1* | 7/2016 | Hoffmeister | G10L 15/142 |
| 9,558,749 B1 | 1/2017 | Seeker-Walker et al. | |
| 9,589,578 B1* | 3/2017 | Dippenaar | H04L 67/00 |
| 9,646,610 B2 | 5/2017 | Macho | |
| 9,747,899 B2 | 8/2017 | Pogue et al. | |
| 9,940,936 B2 | 4/2018 | Sejnoha et al. | |
| 9,992,642 B1 | 6/2018 | Rapp et al. | |
| 10,043,521 B2* | 8/2018 | Booklet | G10L 17/18 |
| 10,057,421 B1 | 8/2018 | Chiu et al. | |
| 10,199,037 B1* | 2/2019 | Filimonov | G10L 15/08 |
| 10,304,465 B2* | 5/2019 | Gunn | G10L 15/08 |
| 10,332,525 B2 | 6/2019 | Seeker-Walker et al. | |
| 10,621,992 B2* | 4/2020 | Qian | G10L 25/78 |
| 2002/0193989 A1 | 12/2002 | Geilhufe et al. | |
| 2003/0040339 A1 | 2/2003 | Chang | |
| 2003/0040907 A1* | 2/2003 | Chang | G10L 15/32 |
| | | | 704/231 |
| 2003/0120486 A1 | 6/2003 | Brittan et al. | |
| 2003/0216909 A1 | 11/2003 | Davis et al. | |
| 2007/0129949 A1 | 6/2007 | Alberth et al. | |
| 2008/0118080 A1 | 5/2008 | Gratke et al. | |
| 2008/0154599 A1* | 6/2008 | Muschett | G10L 17/00 |
| | | | 704/250 |
| 2008/0312926 A1* | 12/2008 | Vair | G10L 17/14 |
| | | | 704/E17.011 |
| 2009/0055178 A1 | 2/2009 | Coon | |
| 2010/0009719 A1 | 1/2010 | Oh et al. | |
| 2010/0121636 A1 | 5/2010 | Burke et al. | |
| 2010/0124896 A1 | 5/2010 | Kumar | |
| 2010/0179811 A1* | 7/2010 | Gupta | G10L 15/22 |
| | | | 704/E15.044 |
| 2010/0185448 A1 | 7/2010 | Meisel | |
| 2010/0289994 A1 | 11/2010 | Nonaka | |
| 2011/0054899 A1 | 3/2011 | Phillips et al. | |
| 2011/0066634 A1* | 3/2011 | Phillips | G10L 15/22 |
| | | | 707/769 |
| 2011/0224985 A1* | 9/2011 | Hanazawa | G10L 15/07 |
| | | | 704/E15.009 |
| 2012/0016671 A1* | 1/2012 | Jaggi | G10L 15/22 |
| | | | 704/235 |
| 2012/0034904 A1 | 2/2012 | LeBeau et al. | |
| 2012/0035924 A1 | 2/2012 | Jitkoff et al. | |
| 2012/0041764 A1* | 2/2012 | Xu | G10L 15/065 |
| | | | 704/256.1 |
| 2012/0127072 A1 | 5/2012 | Kim | |
| 2012/0150541 A1* | 6/2012 | Talwar | G10L 15/065 |
| | | | 704/E15.005 |
| 2012/0197637 A1 | 8/2012 | Gratke et al. | |
| 2012/0278061 A1* | 11/2012 | Weinstein | G10L 15/065 |
| | | | 704/2 |
| 2012/0281885 A1 | 11/2012 | Syrdal et al. | |
| 2012/0310646 A1 | 12/2012 | Hu et al. | |
| 2012/0329389 A1 | 12/2012 | Royston et al. | |
| 2013/0080167 A1 | 3/2013 | Mozer | |
| 2013/0080171 A1 | 3/2013 | Mozer et al. | |
| 2013/0289994 A1* | 10/2013 | Newman | G10L 15/32 |
| | | | 704/E15.005 |
| 2013/0339028 A1* | 12/2013 | Rosner | G10L 15/08 |
| | | | 704/E11.001 |
| 2014/0012573 A1 | 1/2014 | Hung et al. | |
| 2014/0012586 A1 | 1/2014 | Rubin et al. | |
| 2014/0039888 A1 | 2/2014 | Taubman et al. | |
| 2014/0163978 A1* | 6/2014 | Basye | G10L 15/28 |
| | | | 704/233 |
| 2014/0249817 A1 | 9/2014 | Hart et al. | |
| 2014/0274203 A1 | 9/2014 | Ganong, III et al. | |
| 2014/0274211 A1 | 9/2014 | Sejnoha et al. | |
| 2014/0278435 A1 | 9/2014 | Ganong, III et al. | |
| 2014/0365225 A1* | 12/2014 | Haiut | G10L 15/22 |
| | | | 704/275 |
| 2015/0006176 A1 | 1/2015 | Pogue et al. | |
| 2015/0025890 A1* | 1/2015 | Jagatheesan | G10L 15/30 |
| | | | 704/255 |
| 2015/0053779 A1 | 2/2015 | Adamek et al. | |
| 2015/0106085 A1 | 4/2015 | Lindahl | |
| 2015/0154953 A1* | 6/2015 | Bapat | G10L 15/06 |
| | | | 704/251 |
| 2015/0245154 A1* | 8/2015 | Dadu | G06F 1/3293 |
| | | | 381/56 |
| 2015/0340042 A1 | 11/2015 | Sejnoha et al. | |
| 2016/0019884 A1* | 1/2016 | Xiao | G10L 15/063 |
| | | | 704/232 |
| 2016/0039356 A1 | 2/2016 | War et al. | |
| 2016/0077574 A1* | 3/2016 | Bansal | G06F 1/3293 |
| | | | 704/275 |
| 2016/0078869 A1 | 3/2016 | Syrdal et al. | |
| 2016/0189706 A1* | 6/2016 | Zopf | G10L 15/063 |
| | | | 704/254 |
| 2016/0300568 A1* | 10/2016 | Sharifi | G10L 15/1815 |
| 2016/0314782 A1 | 10/2016 | Klimanis | |

(56) References Cited

U.S. PATENT DOCUMENTS

| | | |
|---|---|---|
| 2016/0358605 A1 | 12/2016 | Ganong, III et al. |
| 2017/0116983 A1 | 4/2017 | Furukawa et al. |
| 2017/0118336 A1* | 4/2017 | Tapuhi ............... G06F 16/3329 |
| 2018/0018973 A1* | 1/2018 | Moreno ................. G10L 17/08 |
| 2018/0047386 A1* | 2/2018 | Garner .................. G10L 15/22 |
| 2018/0108343 A1* | 4/2018 | Stevans ................. G10L 15/26 |
| 2018/0114531 A1 | 4/2018 | Kumar et al. |
| 2018/0130468 A1 | 5/2018 | Pogue et al. |
| 2018/0158461 A1 | 6/2018 | Wolff et al. |
| 2018/0182380 A1 | 6/2018 | Fritz et al. |
| 2018/0254042 A1* | 9/2018 | Jo .............................. G06F 3/16 |
| 2018/0301144 A1* | 10/2018 | Park ......................... G10L 15/06 |
| 2018/0310144 A1 | 10/2018 | Rapp et al. |
| 2018/0358005 A1* | 12/2018 | Tomar ................. G06N 3/0445 |
| 2018/0366114 A1 | 12/2018 | Anbazhagan et al. |
| 2019/0073999 A1* | 3/2019 | Prémont ................. G10L 15/32 |
| 2019/0311715 A1 | 10/2019 | Pfeffinger et al. |
| 2019/0355365 A1 | 11/2019 | Kim et al. |
| 2020/0035231 A1 | 1/2020 | Parthasarathi et al. |

FOREIGN PATENT DOCUMENTS

| | | |
|---|---|---|
| CN | 103632668 A | 3/2014 |
| CN | 104575504 A | 4/2015 |
| CN | 105009204 A | 10/2015 |
| CN | 105575395 A | 5/2016 |
| CN | 106098059 A | 11/2016 |
| EP | 1511010 A1 | 3/2005 |
| EP | 2 899 955 A1 | 7/2015 |
| EP | 2932500 B1 | 2/2017 |
| WO | 2014/066192 | 5/2014 |

OTHER PUBLICATIONS

Written Opinion dated Sep. 21, 2017 from corresponding International Application No. PCT/CN2016/105343, 4 pages.

IPRP dated May 23, 2019 from corresponding International Application No. PCT/CN2016/105343, 6 pages.

Chinese Office Action and Translation thereof for Chinese Application No. 201480013903.1 dated Jul. 28, 2017.

International Preliminary Report on Patentability for International Application No. PCT/US2016/037495 dated Dec. 27, 2018.

International Preliminary Report on Patentability for International Application No. PCT/US2014/024270 dated Sep. 24, 2015.

International Search Report and Written Opinion for International Application No. PCT/US2016/037495 dated Dec. 5, 2016.

International Search Report and Written Opinion for International Application No. PCT/US2014/024270 dated Jun. 16, 2014.

International Preliminary Report on Patentability for International Application No. PCT/US2016/017317 dated Aug. 23, 2018.

International Search Report and Written Opinion for International Application No. PCT/US2016/017317 dated May 12, 2016.

Supplementary European Search Report of European application No. 16921389.9 dated May 12, 2020, 11 pages.

Ramabhadran, B. et al., "Acoustics-only based automatic phoenetic baseform generation", Acoustics, Speech and Signal Processing, 1998, Proceedings of the 1988 IEEE International Conference on Seattle, WA, USA May 12-15, 1998, New, NY, USA, IEE, US, vol. 1, May 12, 1998 (May 12, 1998), pp. 309-312, XP010279161

Beaufays, F. et al., "Learning name pronunciatons in automatic speech recognition systems", Proceedings 15th IEEE International Conference on Tools with Artificial Intelligence. ICTAI 2003, Sacramento, CA, Nov. 3-5, 2003; [IEEE International Conference on Tools with Artificial Intelligence], Los Alamitos, CA, IEEE COMP. SOC, US, vol. CONF. 15, Nov. 3, 2003 (Nov. 3, 2003), pp. 233-240, XP010672233.

Delgine, S. et al., "Automatic generation and selection of multiple pronunciations for dynamic vocabularies", 2001 IEEE International Conference on Acoustics, Speech and Signal Processing. Proceedings (ICASSP). Salt Lake City, UT, May 7-11, 2001; [IEEE International Conference on Acoustics, Speech and Signal Processing (ICASSP)], New York, NY: IEEE US, vol. 1, May 7, 2001 (May 7, 2001), pp. 565-568, XP010802793.

* cited by examiner

TECHNIQUES FOR LANGUAGE INDEPENDENT WAKE-UP WORD DETECTION

RELATED APPLICATION

This Application is a national stage filing under 35 U.S.C. 371 of International Patent Application Serial No. PCT/CN2016/105343, filed Nov. 10, 2016, and titled "TECHNIQUES FOR LANGUAGE INDEPENDENT WAKE-UP WORD DETECTION." The entire contents of this application are incorporated herein by reference in their entirety.

BACKGROUND

A system may be speech enabled, allowing users to interact with the system via speech, for example, by allowing users to speak commands to control the system. Engaging a speech-enabled system often requires users to signal to the speech-enabled system that the user intends to interact with the system by speaking. For example, a speech-enabled system may be configured to begin recognizing speech after a manual trigger, such as a button push (e.g., a button of a physical device and/or a button within a user interface of a speech recognition software application), launch of an application, or other manual interaction with the system, is provided to wake-up a device or to alert the system that speech following the manual trigger is directed to the system. However, manual triggers complicate the interaction with the speech-enabled system and, in some cases, may be inconvenient or impossible to use (e.g., when the user's hands are otherwise occupied, such as when operating a vehicle, or when the user is too remote from the system to manually engage with the system or an interface thereof).

When a mobile device is operating in a low power mode (e.g., in a sleep, hibernate or idle mode), the actions required to engage the voice response system typically become even more extensive. In particular, the user need first wake-up the mobile device itself before the voice response system can be engaged using manual action or an explicit voice trigger. For example, a user may have to press a button to turn-on the display and/or enable one or more processors, may have to manipulate one or more controls to ready the mobile device for use, and/or may have to input a passcode if the mobile device has been inactive for a certain period of time. To address the inconvenience (and often inapplicability) of manual triggers, some speech-enabled systems allow for voice triggers to be spoken to begin engaging with the system, thus eliminating at least some (if not all) manual actions and facilitating generally hands-free access to the speech-enabled system. A voice trigger may comprise a designated word or phrase (e.g., "Hello Dragon") that is spoken by the user to indicate to the speech-enabled system that the user intends to interact with the system (e.g., to issue one or more commands to the system).

A voice trigger is also referred to herein as a "wake-up word" or "WuW." After a wake-up word has been detected, the system begins recognizing subsequent speech spoken by the user. In most cases, unless and until the system detects the wake-up word, the system will assume that acoustic input received from the environment is not directed to or intended for the system and will not process the acoustic input further. If a device (e.g., a mobile device such as a smart phone) is operating in a low-power mode, the device will remain inactive until a wake-up word is detected by the device.

SUMMARY

Some embodiments include a method of enabling wake-up word detection in a target language on a user device is provided. The method comprises receiving acoustic input of a user speaking a wake-up word in the target language, providing acoustic features derived from the acoustic input to an acoustic model stored on the user device to obtain a sequence of speech units corresponding to the wake-up word spoken by the user in the target language, the acoustic model trained on a corpus of training data in a source language different than the target language, and storing the sequence of speech units on the user device for use in subsequent wake-up word detection.

Some embodiments include user device configured to enable wake-up word detection in a target language, the user device comprising at least one microphone configured to obtain acoustic information from the environment of the user device, at least one computer readable medium storing an acoustic model trained on a corpus of training data in a source language different than the target language, and at least one processor coupled to the at least one computer readable medium and programmed to perform receiving, from the at least one microphone, acoustic input from the user speaking a wake-up word in the target language, providing acoustic features derived from the acoustic input to the acoustic model to obtain a sequence of speech units corresponding to the wake-up word spoken by the user in the target language, and storing the sequence of speech units on the user device for use in subsequent wake-up word detection.

Some embodiments include a user device configured to perform wake-up word detection in a target language. The user device comprises at least one microphone configured to obtain acoustic information from the environment of the user device, at least one computer readable medium storing an acoustic model trained on a corpus of training data in a source language different than the target language, and storing a first sequence of speech units obtained by providing acoustic features derived from audio comprising the user speaking a wake-up word in the target language to the acoustic model, and at least one processor coupled to the at least one computer readable medium and programmed to perform receiving, from the at least one microphone, acoustic input from the user speaking in the target language while the user device is operating in a low-power mode, applying acoustic features derived from the acoustic input to the acoustic model to obtain a second sequence of speech units corresponding to the acoustic input, determining if the user spoke the wake-up word at least in part by comparing the first sequence of speech units to the second sequence of speech units, and exiting the low-power mode if it is determined that the user spoke the wake-up word.

Some embodiments include a method of performing wake-up word detection on a user device, the method comprising, while the user device is operating in a low-power mode, receiving acoustic input from a user speaking in a target language, providing acoustic features derived from the acoustic input to an acoustic model stored on the user device to obtain a first sequence of speech units corresponding to the acoustic input, the acoustic model trained on a corpus of training data in a source language different than the target language, determining if the user spoke the wake-up word at least in part by comparing the first sequence of speech units to a second sequence of speech units stored on the user device, the second sequence of speech units obtained by applying acoustic features derived from audio comprising the user speaking the wake-up word in the target language to the acoustic model, and exiting the low-power mode if it is determined that the user spoke the wake-up word.

BRIEF DESCRIPTION OF DRAWINGS

Various aspects and embodiments will be described with reference to the following figures. The figures are not necessarily drawn to scale.

DETAILED DESCRIPTION

As discussed above, wake-up word detection facilitates voice activation of a device (e.g., a mobile device operating in a low-power mode). However, wake-up word detection may not be available in the language spoken by a given user. In particular, automatic speech recognition generally involves processing a speech signal to extract relevant acoustic characteristics (e.g., Mel-frequency cepstral coefficients (MFCCs)) from the speech signal and applying the acoustic characteristics to an acoustic model configured to provide hypotheses regarding the likely sequence of fundamental speech units (e.g., phones, phonemes, etc.) contained in the speech signal. Acoustic models are typically trained using a relatively large corpus of training data to as to correctly identify the phonetic content of a spoken utterance. For example, acoustic training may be utilized to train one or more acoustic models. Via training, an acoustic model "learns" acoustic characteristics of the training data utilized so as to be able to accurately identify sequences of speech units in speech data received when the trained ASR system is subsequently deployed. To achieve adequate training, relatively large amounts of training data in a given language are generally needed (e.g., hundreds or thousands of hours of speech data) to learn the characteristics and statistics of the corresponding language.

A number of machine learning techniques have been used to implement acoustic models including, but not limited to, multi-layer neural networks, hidden Markov models (HMMs), Gaussian mixture models (GMMs), etc. Larger speech units such as words or phrases are then determined from the hypotheses regarding the sequence of fundamental speech units determined by the acoustic model. Typically, a language model trained to capture the language statistics to provide the likelihood of particular word sequences is then used to hypothesize the most likely sequence of words represented by the sequence of speech units produced by the acoustic model. In this way, a speech input can be converted into the sequence of words contained in the speech signal, thus converting an audio signal to its language content.

Modern systems frequently provide automatic speech recognition service in the cloud. In particular, speech recognition services are frequently provided by automatic speech recognition servers accessible via one or more networks (e.g., via the Internet). Network connected devices (e.g., personal computers, mobile devices such as laptops and smart phones, etc.) can thereby access speech recognition services to have the content of speech input received by the network connected devices recognized via the cloud. Often a speech recognition service will provide comprehensive speech recognition services in numerous languages, for example, by training acoustic models and language models in various desired languages. In this way, sophisticated automatic speech recognition in numerous languages can be performed using any device capable of communicating over a network (e.g., capable of accessing the Internet) and configured to communicate with automatic speech recognition service(s). In the mobile context, a user may speak to the user's mobile device (e.g., a smart phone, personal digital assistant, wearable device, or any other mobile device) and the speech captured by the mobile device can be transmitted over the network to be recognized by an automatic speech recognition service provide via the cloud.

However, mobile devices are generally power-limited in that they are frequently expected to operate for relatively extended periods of time off of battery power. To conserve power, mobile devices frequently enter a low power mode (e.g., a sleep, idle or hibernate mode) after some duration of inactivity. A low power mode refers generally to any mode or state that is entered to conserve power that conventionally requires one or more wake-up actions to exit (e.g., to activate the mobile device). Mobile devices may have more than one low power mode and different mobile devices may power down different components when entering a low power mode. However, mobile devices will typically have some variation of a low power mode that conventionally requires action to exit the low power mode and transition to an active mode.

Entering a low power mode may include turning off the display, shutting down one or more processors (e.g., disabling the clock tree associated with one or more processors) and/or deactivating components that would otherwise draw power if left operational. Automatically entering a low power mode after a designated interval of time may significantly extend the period that a mobile device can operate on battery power before requiring a recharge. In view of the relative importance of conserving power in a mobile device, many mobile devices default to a relatively short duration of inactivity before powering down and going to sleep, such that a mobile device may frequently be in a low power mode when a user wants to access functionality on the mobile device.

As such, when operating in low-power mode, a mobile device typically will not have access to automatic speech recognition services provided in the cloud because establishing a network connection to utilize cloud resources each time acoustic input is received by the mobile device (e.g., when a microphone detects acoustic activity) to assess whether a wake-up word has been spoken could utilize significant enough processing power to frustrate the efforts of powering down the mobile device to a low power mode in the first place. Therefore, wake-up word detection using network resources is generally not available and may not be feasible in many circumstances. As a result, wake-up word detection is generally performed using the limited resources available to the mobile device while operating in the low-power mode (e.g., a voice activity detector, a phone loop component, a low-power processor to perform small vocabulary recognition, etc). Thus, a suitably trained acoustic model may not be available on a mobile device for the range of languages for which wake-up word detection is sought, at least in part because acoustic models in numerous or even multiple languages are generally not available on the mobile device itself. As a consequence, wake-up word detection may be unavailable for a wide range of speakers that would like this feature to be available in their own spoken language.

The inventors have recognized that an acoustic model trained for a first language can be used to recognize the phonetic content of an utterance spoken in a second language different than the first language. As used herein, an acoustic model trained for a first language or trained via a first language refers to an acoustic model that is trained using training data predominantly, substantially or exclusively in a first language. In this way, an acoustic model trained for a first language can be used to assist in performing wake-up word detection in any desired language, regardless of whether a trained acoustic model is available to the mobile device for that desired language. Accordingly, language independent wake-up word detection may be performed using any available and suitably trained acoustic model (e.g., an acoustic model on a mobile device and/or available to a mobile device in a low-power mode).

According to some embodiments, a user speaks an enrollment utterance that includes, or consists of, a desired wake-up word in a desired language (target language) that, for example, a trained acoustic model may not be available. For example, a mobile device for which wake-up word detection in the desired language is sought may not have stored thereon an acoustic model trained for the desired language and/or while such an acoustic model may be available via the cloud, no such acoustic model may be available when the mobile device is operating in a low-power mode. However, an acoustic model trained for a second language (source language) may be available (e.g., may be stored on a mobile device and/or accessible while the mobile device is operating in a low-power mode). Acoustic features derived from the enrollment utterance may be applied as input to the available acoustic model to obtain a sequence of speech units (e.g., phonemes, di-phones, tri-phones, HMI states, or any other suitable sub-word speech unit) believed to correspond to the received acoustic features. The resulting sequence of speech units can then be stored as the pronunciation of the wake-up word spoken by the user in the desired language (e.g., may be stored in a user dictionary as the pronunciation of the speaker of the desired wake-up word). That is, the pronunciation may be stored and associated with the desired wake-up word for use in subsequent wake-up word detection.

According to some embodiments, the enrollment utterance is used to adapt the acoustic model to the speaker. In particular, speaker adaptation may be applied to the acoustic model to obtain a speaker-adapted acoustic model that can be used for the speaker to perform wake-up word detection. For example, the enrollment utterance and the resulting sequence of speech units from the acoustic model may be used to adapt the acoustic model to the user. In this manner, an acoustic model that has been trained, for example, based on a large corpus of training data for a source language can be used and adapted to perform wake-up word detection of a desired target language. As such, language independent wake-up word detection may be implemented by performing the process discussed above and described in further detail below. According to some embodiments, one or more noise models may be added to the enrollment utterance to improve the robustness of wake-up word detection in the presence of noise and to facilitate speaker adaptation.

Following below are more detailed descriptions of various concepts related to, and embodiments of, techniques of language independent wake-up word detection. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 1:
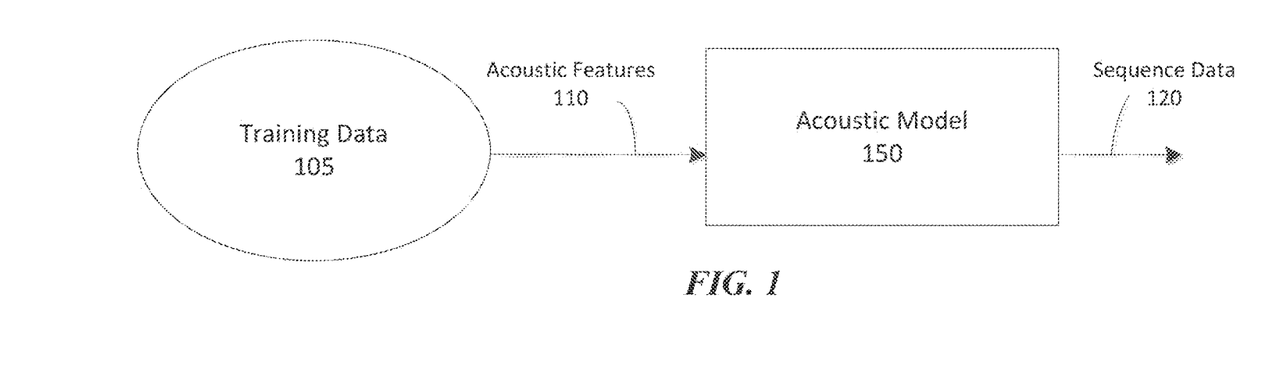
FIG. 1 illustrates an example of an acoustic model providing sequence date from acoustic features derived from acoustic input.

FIG. 1 illustrates an acoustic model 150 trained via training data 105, for example, a large corpus of speech data for a given language (e.g., English). Acoustic model 150 is configured to receive, as an input, acoustic features 110 derived and/or extracted from speech data (e.g., MFCCs or other desired acoustic features extracted from a desired number of adjacent and/or overlapping frames of input speech data). During training, acoustic features 110 correspond to acoustic features derived from training data 105 and, during deployment subsequent to training, features 110 correspond to acoustic features derived from speech data to be recognized. Acoustic model 150 includes a plurality of configurable parameters whose values may be iteratively adjusted during training. The nature of the plurality of parameters will depend on the type of acoustic model being used (e.g., neural network, HMM, GMM, etc.).

Acoustic model 150 outputs sequence data 120 in response to received acoustic features 110 in a manner governed by a current set of values assigned to the respective plurality of configurable parameters. Sequence data 120 generally comprises a hypothesis for the sequence of speech units (e.g., phonemes, diphones, triphones or any other suitable sub-word speech unit) believed to correspond to the received acoustic features 110. During training, the outputted sequence data 120 may be compared to expected sequence data (also referred to herein as "ground truth") and, based on the comparison, the current set of values (or a portion of the current set of values) of the plurality of parameters are adjusted accordingly.

The expected sequence data may be obtained in a number of ways, for example, by using an existing trained acoustic model known to give results of sufficient accuracy/quality and applying the training data to the existing trained acoustic model, using stored sequence data previously obtained for the training data, expert generated sequence data (if feasible), or some combination thereof. The process of producing sequence data, comparing the sequence data to expected sequence data and updating values of the parameters of the acoustic model is repeated using the available training data. After completion of training, the trained acoustic model has a set of values established for the plurality of parameters that produces sequence data in accordance with what the acoustic model "learned" from processing the training data. When deployed to perform automatic speech recognition (ASR), acoustic features derived from a user's speech input is provided to the trained acoustic model, which outputs sequence data corresponding to a hypothesis of the word sequence spoken by the user.

As discussed above, an acoustic model trained for the user's spoken language may not be available to a mobile device to perform wake-up word detection (e.g., an acoustic model trained on training data in the user's language may not be resident on the mobile device for use in a low power mode). Accordingly, voice activation of the mobile device may be unavailable to the user. The inventors have developed techniques that utilize an acoustic model trained using training data in a source language to facilitate wake-up word detection in a target language for which an acoustic model trained for the target language is not available, as discussed in further detail below. As such, any acoustic model available to the mobile device in a low power mode can be used to perform wake-up word detection in the user's language, as discussed in further detail below.

Figure 2:
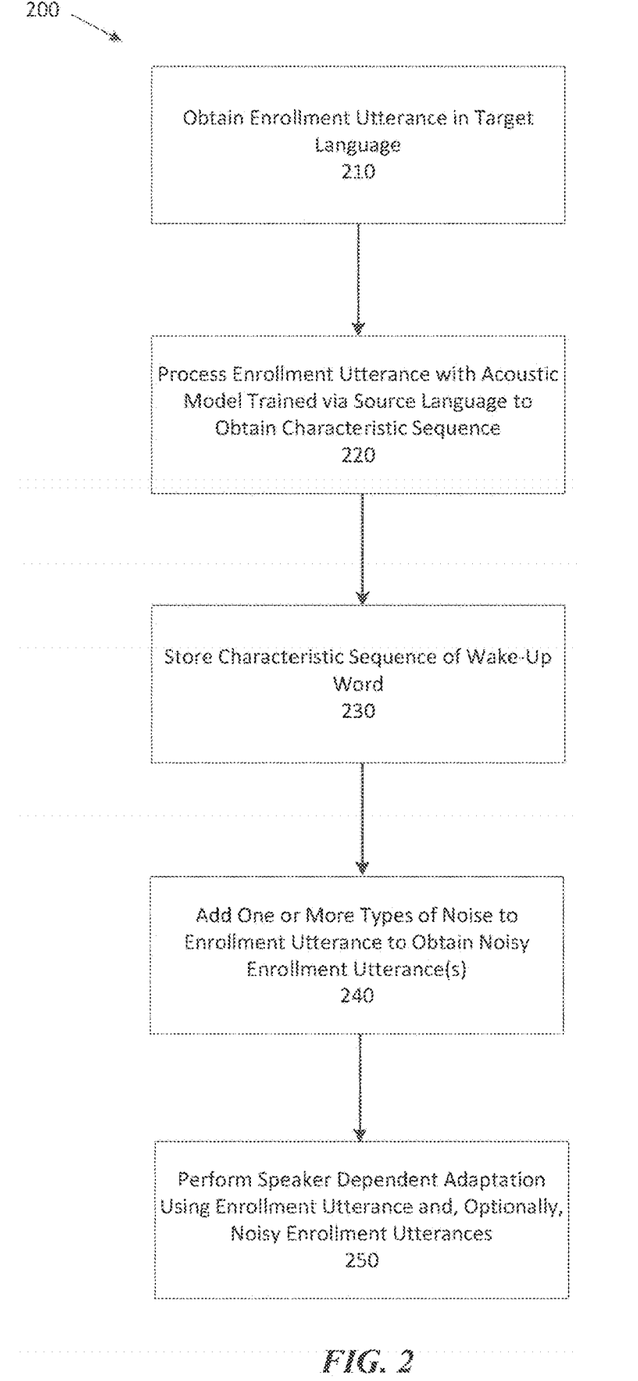
FIG. 2 illustrates a method for enabling language independent wake-up word detection, in accordance with some embodiments.

FIG. 2 illustrates a method of utilizing an acoustic model trained for a source language to perform wake-up word detection on speech data of a target language, in accordance with some embodiments. As used herein, the source language refers to the predominant, primary or exclusive language of the training data on which an acoustic model was trained, and the target language refers to a language different from the source language for which wake-up word detection is sought. In act 210, an enrollment utterance is obtained from a user speaking in the target language. For example, the user may speak an enrollment utterance that includes a wake-up word spoken in the target language, or the enrollment utterance may consist exclusively of the wake-up word. The user may be prompted to speak a wake-up word predetermined by the system in the target language, or the user may be able to speak a wake-up word of the user's choosing. The latter case allows a user to customize wake-up word interaction with their device and/or allows the user to utilize a wake-up word as a command, as discussed in further detail below.

In act 220, the speech data corresponding to the wake-up word contained in the enrollment utterance is provided to an acoustic model trained for a source language (e.g., a well-trained acoustic model that has been trained on a large corpus of speech data in the source language). In particular, acoustic features may be derived from the enrollment utterance and processed by the trained acoustic model to recognize a sequence of speech units (e.g., a phoneme sequence) corresponding to the wake-up word spoken in the target language. In this manner, the acoustic model trained via the source language is used to produce a phoneme sequence that characterizes the sounds of the wake-up word spoken in the target language.

In act 230, the sequence of speech units resulting from processing the wake-up word spoken in the target language is stored (e.g., in a dictionary on the user's mobile device) as the reference sequence of speech units characterizing the wake-up word. For example, the sequence of speech units may comprise the source language phoneme sequence that characterizes the wake-up word spoken in the target language. This reference sequence of speech units can then be used upon deployment to detect when the user has spoken the wake-up word in the target language (e.g., by comparing an input sequence of speech units obtained using the acoustic model on speech data spoke by the user to a mobile device operating in a low-power mode with the reference sequence of speech units), as discussed in further detail below.

In act 240, one or more types of noise are added to the enrollment utterance to obtain noisy enrollment utterances to improve the performance of wake-up word detection in corresponding acoustic environments. In particular, when a user is seeking to voice activate a mobile device, the user and the device may be in an acoustic environment different than during enrollment. Specifically, a user may perform enrollment in a relatively noise free environment but may wish to perform voice activation while driving, walking or in other acoustic environments having spurious acoustic noise. Accordingly, the inventors have appreciated that by adding one or more types of noise, wake-up word detection may be improved. In particular, noise present in common environments in which a user may speak a wake-up may be added to the enrollment utterance to improve wake-up word detection when used in those common environments. For example, car noise, street noise or any other desired noise may be added to the enrollment utterance and applied to the acoustic model to obtain respective phoneme sequences corresponding to the noisy enrollment utterance. Thereafter, the enrollment utterance, the noisy enrollment utterances and the corresponding respective phoneme sequences are used to adapt the acoustic model to the noise environments corresponding to the one or more noise models added to the enrollment utterance (i.e., in act 250 described in further detail below). The noise adapted acoustic models may then be used thereafter to improve performance of wake-up word detection in the corresponding noise environments. It should be appreciated that any desired type of noise in any combination may be used to corrupt the enrollment utterance to adapt the acoustic model to the corresponding noise environment, as the aspects are not limited in this respect. It should be further appreciated that, in some embodiments, act 240 may not be performed.

In act 250, the enrollment utterance (i.e., the audio signal comprising the wake-up word), noisy enrollment utterances (e.g., in embodiments in which act 240 is performed), and the output of the acoustic model processing acoustic features of the enrollment utterance (e.g., the reference sequence of speech units corresponding to the wake-up word) are used to perform speaker adaptation on the acoustic model. There are numerous techniques for adapting an acoustic model to a speaker using speech data from the user. The choice of a particular adaptation technique may be driven by the type of acoustic model being adapted. For example, certain adaptation techniques may be more appropriate for a GMM or an HMM-based acoustic model than for a neural network-based acoustic model. Suitable adaptation techniques include, but are not limited to, maximum a posteriori (MAP) adaptation, maximum likelihood linear regression (MLLR) adaption, a linear input network (LIN) layer (e.g., for a neural network-based acoustic model), vocal tract length normalization (VTLN), cluster adaptation techniques, eigenvoice techniques, etc. Any suitable speaker-dependent adaptation may be performed to provide an adapted acoustic model for the particular user, as the aspects are not limited in this respect. The adapted acoustic model can then be used to improve the performance of wake-up word detection for the user in the target language, as discussed in further detail below.

It should be appreciated that while adapting the acoustic model using the enrollment utterance and/or using one or more noise models facilitates improved wake-up word detection, such techniques are optional and need not be performed (e.g., performing acts 240 and/or 250 is optional), as performing language independent wake-up word detection is not limited in this respect. Additionally, one or more tasks may be associated with the wake-up word enrolled by the user. For example, a user may want one or more tasks to be performed, in addition to, or in place of, transitioning from a low power when a wake-up word is detected. For example, a user may provide an enrollment utterance including the wake-up word "What time is it?" spoken by the user in the target language and a task by which the mobile device responds with the time (e.g., by displaying the time on the display or synthesizing a voice response) may be associated with the reference sequence obtained by processing this wake-up word using the acoustic model trained via the source language. Providing the temperature, or providing an audible alert (e.g., a beep, a ring) or a tactile alert (e.g., a vibration) to assist a user in locating their mobile device are further examples of tasks that may be associated with a wake-up word. Any suitable task may be associated with a wake-up word, as the aspects are not limited in this respect. Furthermore, it should be appreciated that acts 210-230 (and optionally act 240) may be repeated to obtain reference sequences for any number of wake-up words. According to some embodiments, method 200 can be employed to provide wake-up words that transition the mobile device to a variety of different power modes, perform tasks without leaving the current low-power mode and/or a combination thereof. In this manner, a command vocabulary in the user's language can be created that can be used to activate the mobile device and/or to perform various tasks associated with the same or different wake-up words, allowing a user to customize the voice activation capabilities of the user's device.

It should be appreciated that the techniques described herein are not dependent on any particular source or target language. As long as an acoustic model that has been trained via a first language is available, a device can be enabled to perform wake-up word detection in any language desired by the user, thus language independent wake-up word detection can be achieved. That is, the techniques described herein are not limited for use with any particular source language, target language or source and target language combination.

Figure 3:
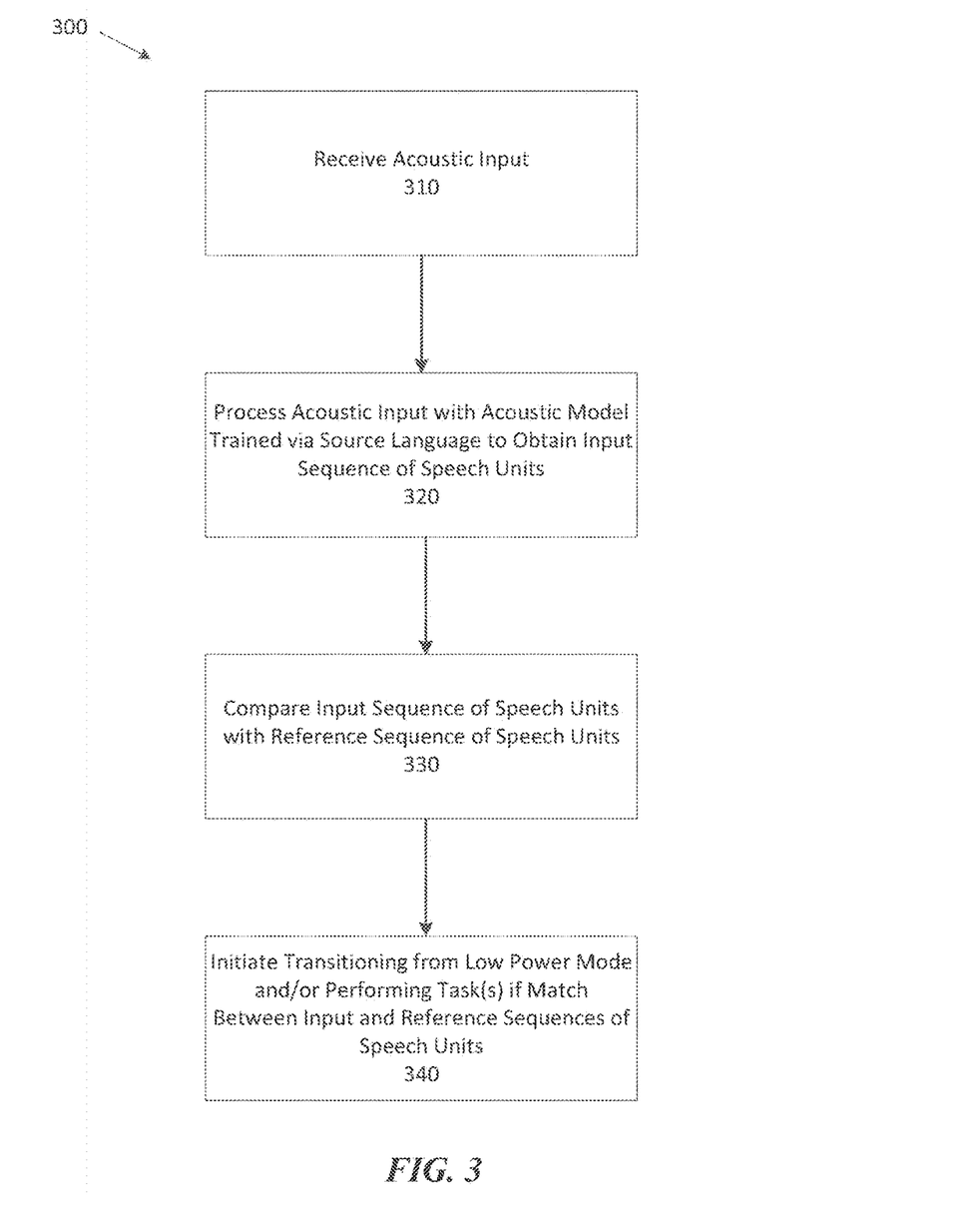
FIG. 3 illustrates a method of performing wake-up word detection in a user's language, in accordance with some embodiments.

FIG. 3 illustrates a method of performing wake-up word detection in a target language using an acoustic model trained on training data in a source language different than the target language. In particular, the acoustic model may be the acoustic model from which a reference sequence of speech units were obtained corresponding to a wake-up word spoken by a user in a target language different from the source language (e.g., a reference sequence of speech units obtained and stored by performing method 200 described in connection with FIG. 2). Wake-up word detection may be performed, for example, on a user's mobile device operating in a low-power mode wherein the mobile device has a local acoustic model that can be utilized without exiting the low-power mode (e.g., without activating or waking up the mobile device).

In act 310, acoustic input is received from the user. For example, a mobile device may receive acoustic input from the environment in which it is located. In act 320, the acoustic input is processed by the acoustic model trained via the source language to obtain an input sequence of speech units corresponding to the acoustic input. For example, acoustic features (e.g., MFCCs) may be derived from the acoustic input and provided as input to the acoustic model which, in turn, generates a sequence of speech units corresponding to the acoustic input (e.g., generates a sequence of phonemes corresponding to the sounds present in the acoustic input).

In act 330, the input sequence of speech units is compared to the reference sequence of speech units, for example, stored in a dictionary on the user's mobile device. In particular, the reference sequence of speech units obtained using the acoustic model trained via the source language to process the enrollment utterance including the wake-up word spoken by the user in the target language may be used to assess whether the input sequence of speech units is a match (e.g., to assess the likelihood that the input sequence of speech units also corresponds to the user speaking a wake-up word). The input and reference sequences may be compared in any suitable way that results in an indication of similarity between the input and reference sequences, provides an indication of the likelihood that the input sequence corresponds to the user speaking a wake-up word in the target language and/or produces a decision as to whether the input sequence of speech units is believed to have resulted from the user speaking a wake-up word. In act 340, if it is determined that there is a match between the input and references sequences of speech units (i.e., if it is determined that the input sequence of speech units corresponds to the speaker having spoken a wake-up word), the process of transitioning from low-power mode is initiated and/or one or more tasks associated with the wake-up word may be performed. For example, when it is determined that the user has spoken a wake-up word, the process of waking up the user's mobile device may be initiated (e.g., the mobile device may be activated to an extent indicated by the wake-up word, such as transitioning the mobile device to an active state). As a result, the mobile device may be transitioned to an active mode for further interaction with the user.

As another example, when it is determined that the user has spoken a wake-up word, it may be determined whether any tasks have been associated with the wake-up word determined to have been spoken by the user and, if so, initiation and/or performance of one or more associated tasks may be performed. It may be the case that in some instances, a task associated with a wake-up word does not require the mobile device to transition from the low-power mode (e.g., a task wherein the phone beeps, vibrates or otherwise emits acoustic, tactile or other output to alert the user to its location, a task that presents the time, date, temperature, etc.) In such instances, the mobile device may remain in the low power mode and the one or more tasks are performed in the low power mode. In other instances, performance of the task may require the mobile device to exit the low power mode. Under such circumstances, low-power mode may be exited followed by performance of task(s) associated with the detected wake-up word. It should be appreciated that act 330 may be performed against multiple reference sequences of speech units that have been stored corresponding to multiple valid wake-up words for which a reference sequence has been obtained. In this manner, language independent wake-up word detection and/or voice activated tasks can be performed, facilitating voice activation and/or control of a mobile device in any language spoken by the user.

Figure 4A:
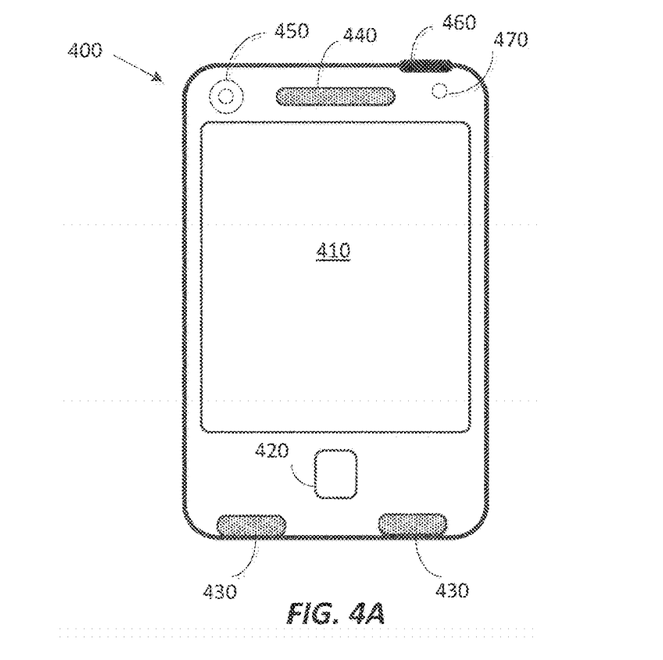
FIGS. 4A and 4B illustrate an exemplary mobile device on which language independent wake-up word detection can be enabled and performed, in accordance with some embodiments.
Figure 4B:
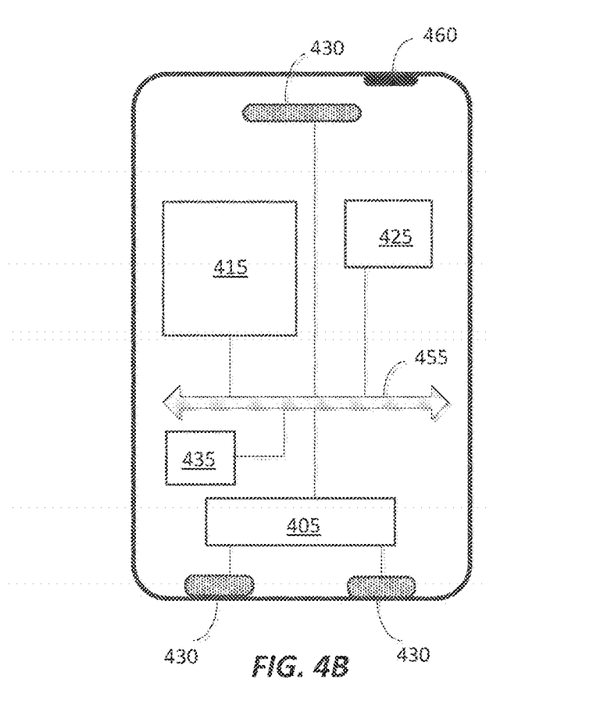

FIGS. 4A and 4B illustrate a mobile device that can be configured to perform language independent wake-up word detection for voice activation and/or control in any desired language. Mobile device 400 is illustrated as having a number of components characteristic of a "smart phone," but it should be appreciated that mobile device 400 may be any generally portable device capable of wireless communications (and/or wired communications) and which includes an input capable of receiving acoustic input (e.g., one or more microphones). Mobile device 400 includes one or more transducers 430 for converting acoustic energy to electrical energy and vice versa. For example, transducers 430 may include one or more speakers and/or one or more microphones arranged on the mobile device to allow input/output (I/O) of acoustic information. Different mobile devices may include differing numbers and arrangements of transducers, any of which may be suitable to facilitate acoustic I/O.

Mobile device 400 may also include one or more wireless communication components 460. For example, mobile communication devices such as cellular telephones will typically have a wireless transceiver capable of communicating with one or more cellular networks. Alternatively, or in addition to, wireless communication component 460 may include a wireless transceiver capable of communicating with one or more other networks or external devices. For example, wireless communication component 460 may include a component configured to communication via the IEEE 802.11 standard (Wi-Fi) to connect to a local area network (LAN), wide area network (WAN) such as the Internet, and/or may include a Bluetooth® transceiver to connect to a Bluetooth® compatible device. Wireless communication component 460 may also include a Global Positioning System (GPS) to communicate with a satellite network to determine the location of the mobile device, or may include one or more other wireless communication transceivers.

To simplify the illustration of exemplary mobile device 400, wireless communication component 460 is used to represent any wireless communication component 460 implemented on mobile device 400 and may include one or multiple components that may be either separate or integrated components, may be independent system components, or may be different system components in communication with one or more other wireless components. That is, wireless communication component 460 denotes one or any combination of components that may be implemented on a mobile device that allows the mobile device 400 to communicate wirelessly with one or more networks, systems and/or other devices. In this manner, when mobile device 400 is active, mobile device 400 may access automatic speech recognition services via one or more automatic speech recognition servers connected to a network (e.g., automatic speech recognition services provided via the cloud).

Mobile device 400 may also include a display 410 for visually presenting information to the user (e.g., presenting one or more prompts to the user). Display 410 may also be configured as an input device, for example, by responding to touch, pen input, etc. Mobile device 400 may include one or more other input components 420 that allow a user to interface with the mobile device. For example, button 420 may be used to initiate wake-up of the mobile device when the mobile device has entered a low power mode such as a sleep mode and/or may be used as a selection button or may include any other functionality when the mobile device is active. Button 420 may be a power button, volume button, or any other input component having any desired functionality. Different mobile devices may have different numbers and arrangements of input components 420 depending on the design of the mobile device.

Mobile device 400 may also include other components such as one or more cameras 450, one or more light emitting diodes (LEDs) 470, one or more motion detectors, and/or any other components. Mobile device 400 may also include a power port 490 for connecting the mobile device to a power source (e.g., wall power) and/or a data port for providing/receiving data to/from another device connected via a data cable. According to some mobile device designs, the data and power port are the same port and can be used both for power and for data. It should be appreciated that mobile device 400 is merely an example of a mobile device suitable for use with any one or combination of voice activation techniques described herein. The mobile device components are described to illustrate common features of smart phones, but no particular one or combination of these components are required. Techniques described herein are not limited for use with any particular mobile device having any particular number or arrangement of components and any mobile device having the ability to receive acoustic input may be suitable, as the aspects described herein are not limited in this respect.

FIG. 4B illustrates an example configuration of system components internal to a mobile device, such as mobile device 400 illustrated in FIG. 4A. Exemplary system components of a mobile device may include a primary processor 415, a secondary processor 425 and an audio codec 405, all illustrated for convenience and clarity of illustration as being interconnected via a common bus 455. Mobile device 400 also includes at least one computer readable medium 435 for storing data, e.g., instructions or programs that can be executed by the processors, state data, or any other information utilized by the mobile device. It should be appreciated that a given mobile device may include more or fewer processing components interconnected in any of numerous ways using any type of interconnection, and the particular configuration illustrated in FIG. 4B is provided to demonstrate some concepts related to generally low power functionality, in accordance with some embodiments.

It should be appreciated that any of the techniques described herein may be implemented on a mobile device having a single processor (or performed on a single processor even when multiple processors are available), and the following discussion with respect to FIG. 4B is provided to describe an example of a mobile device configured to operate in one or more low power modes. As such, the configuration in FIG. 4B is used merely to illustrate a mobile device having a primary and secondary processor that are capable of processing information and of exchanging information via some type of interconnection or series of interconnections or couplings and not to limit the type of mobile device on which techniques described herein may be implemented. In particular, mobile device illustrated in FIG. 4B is used to describe an example of enabling and performing language independent wake-up word detection (i.e., wake-up word detection in a language for which an acoustic model is generally not available in a current mode, such as a low power mode of a mobile device) to allow for voice activation and/or control in the user's language.

Processor 415 may be the system's primary or main processor and generally operates as the central processing unit for the mobile device and, therefore may include a high speed processor that may consume relatively large amounts of power when operating (e.g., when the clock tree is enabled and the processor is executing instructions). Accordingly, when a mobile device enters a low power mode (e.g., powers down into a sleep or idle mode), the primary processor may be powered down to a desired extent (e.g., one or more clocks in the clock tree may be disabled to conserve power). When the mobile device wakes-up (e.g., enters an active mode), the primary processor may be activated or powered up to perform processing tasks that are needed. Generally speaking, when mobile device 400 enters an active mode, the device is enabled for network communications and can access cloud services (e.g., automatic speech recognition services via the Internet).

Processor 425 may be a secondary processor such as a digital signal processor (DSP), co-processor and/or specialized processor to handle some portion or aspect of the processing tasks performed by the mobile device, to assist the primary processor in performing certain functionality, to handle certain specialized processing tasks, and/or to perform certain processing tasks when mobile device 400 is operating in a low-power mode. As such, the secondary processor may be a lower power processor than the primary processor in that less power may consumed by the secondary processor when enabled and operating (e.g., executing instructions). In some embodiments, the secondary processor can be configured to operate at a lower power and/or may be simpler and require less power to power-up and/or keep enabled/powered-up, or may otherwise be generally attractive from a power standpoint. In some embodiments, processor 425 is not a separate processor but instead is a part of processor 415 that remains available in a low-power mode to perform certain processing tasks when mobile device 400 is in a sleep, idle and/or hibernate mode (e.g., in a low-power mode).

To allow for voice activation of a mobile device while operating in a low-power mode, the acoustic environment of the mobile device may need to be monitored in low power modes to obtain acoustic input and determine whether the acoustic input includes a wake-up word or whether the acoustic input resulted from spurious acoustic activity. The term "spurious acoustic activity" refers generally to any acoustic activity (including speech) detected in the acoustic environment of the mobile device that does not correspond to a wake-up word upon which the voice response system can or should act. Thus, when mobile device 400 is operating in a low-power mode, the mobile device 400 may not have access to the network and/or it may not make sense from a power perspective to establish a network connection each time acoustic input is received by the mobile device 400 for evaluation as to whether a user has spoken a wake-up word. As such, performing wake-up word detection may be limited to the resources local to and/or resident on mobile device 400. In this respect, mobile device 400 may include local automatic speech recognition resources (e.g., limited ASR resources) that include an acoustic model and a dictionary storing pronunciation information for a small vocabulary of words, for example, one or more wake-up words, a small command vocabulary, etc. The acoustic model may, for example, have been trained on training data predominantly or entirely in a source language (e.g., English). The local automatic speech recognition resources may be stored in computer readable medium 435 and deployed as one or more programs that can be executed by processor 415 and/or processor 425.

The user of mobile device 400 may speak a language different than the source language on which the acoustic model was trained. To enable wake-up word detection in the language of the user, techniques described herein may be performed. For example, method 200 described in connection with FIG. 2 may be performed to enable mobile device 400 to perform wake-up detection in a target language different than the source language on which the available acoustic model was trained. In particular, the user may be prompted to speak an enrollment utterance that includes the desired wake-up word in the target language (e.g., the language spoken by the user). The user may be prompted via mobile device, for example, using the display interface, via synthesized speech provided via a speaker, or via any one or combination of interface elements. Mobile device 400 may obtain the enrollment utterance via one or more microphones 130 provided on the device (e.g., by performing exemplary act 210 described in connection with FIG. 2). Mobile device 400, either alone or using network resources, may process the enrollment utterance by applying the wake-up word spoken by the user to the acoustic model (e.g., by performing exemplary act 220 described in connection with FIG. 2). For example, acoustic features derived from audio of the user speaking the wake-up word in the target language may be provided as input to the acoustic model trained in a source language to obtain a sequence of speech units corresponding to the wake-up word.

The sequence of speech units obtained from the acoustic model may be stored in the dictionary on mobile device 400 (e.g., a dictionary stored on computer readable medium 435) as a reference sequence corresponding to the wake-up word spoken in the target language (e.g., by performing exemplary act 230 described in connection with FIG. 2). The stored sequence of speech units can thereafter be used as the reference sequence to perform wake-up word detection, as discussed above and in further detail below. Additionally, the acoustic model local to mobile device 400 may be adapted to the user using the enrollment utterance and the reference sequence of speech units (e.g., by performing exemplary act 240 described in connection with FIG. 2) to improve wake-up detection for the particular user. Furthermore, the acoustic model may be further adapted using one or more noise models to adapt the acoustic model to one or more corresponding acoustic environments (e.g., by performing exemplary act 250 described in connection with FIG. 2).

In this manner, an acoustic model available on a mobile device 400 (or available to a mobile device 400 in a low-power mode) can be used to enable wake-up word detection for one or more wake-up words in a target language spoken by the user. It should be appreciated that this process can be repeated for any number of wake-up words. In particular, a user may desire to have different wake-up words perform different functionality. For example, a user may want to have a wake-up word for waking the mobile device as well as a wake-up word to which the mobile device performs an associated task. Some tasks may require the mobile device to leave a low-power mode while others may not. Thus, by repeating the process, a user can create a wake-up word command vocabulary in the user's language using an available acoustic model on the mobile device. Thus, language independent wake-up word detection may be enabled to achieve voice activation and/or control in the user's language.

Subsequent to enrollment, wake-up detection in the language spoken by the user can be performed by mobile device 400. In particular, when mobile device 400 is operating in a low power mode, the mobile device may monitor the acoustic environment to receive acoustic input (e.g., by performing exemplary act 310 described in connection with FIG. 3). For example, in the low-power mode, microphone(s) 430 may continue to receive acoustic input to which low level processing may be performed (e.g., voice activity detection, phone loops, spectral analysis, etc.). According to some embodiments, acoustic input received by microphone(s) 430 is processed by an acoustic model local to the mobile device 400 and/or available to the mobile device 400 in low-power mode to obtain a sequence of speech units corresponding to the acoustic input (e.g., by performing exemplary act 320 described in connection with FIG. 3). For example, acoustic features may be derived from the acoustic input and provided as input to the local acoustic model to obtain an input sequence of speech units characterizing the sounds of the acoustic input.

In turn, the input sequence of speech units may be compared to a reference sequence of speech units stored on mobile device 400 (e.g., stored on computer readable medium 435) to assess whether the user spoke a wake-up word (e.g., by performing exemplary act 330 described in connection with FIG. 3). As discussed above, any suitable comparison may be used to reach a determination as to whether the user spoke a wake-up word in the target language. When it is determined that the user spoke a wake-up word, initiation of a transition from the low-power mode, initiation or performance of one or more tasks associated with the wake-up word, or a combination thereof may be performed (e.g., by performing exemplary act 340 described in connection with FIG. 3). As discussed above, the input sequence of speech units obtained from the acoustic input can be compared to any reference sequence stored on the mobile device to determine if any valid wake-up was spoken by the user, and corresponding action may be performed when it is determined that the valid wake-up word was spoken. In this manner, voice activation and/or control of mobile device 400 in a user's language can be achieved even if an acoustic model trained via the user's language may not be available to the mobile device 400 (e.g., when operated in a low power mode or otherwise).

Figure 5:
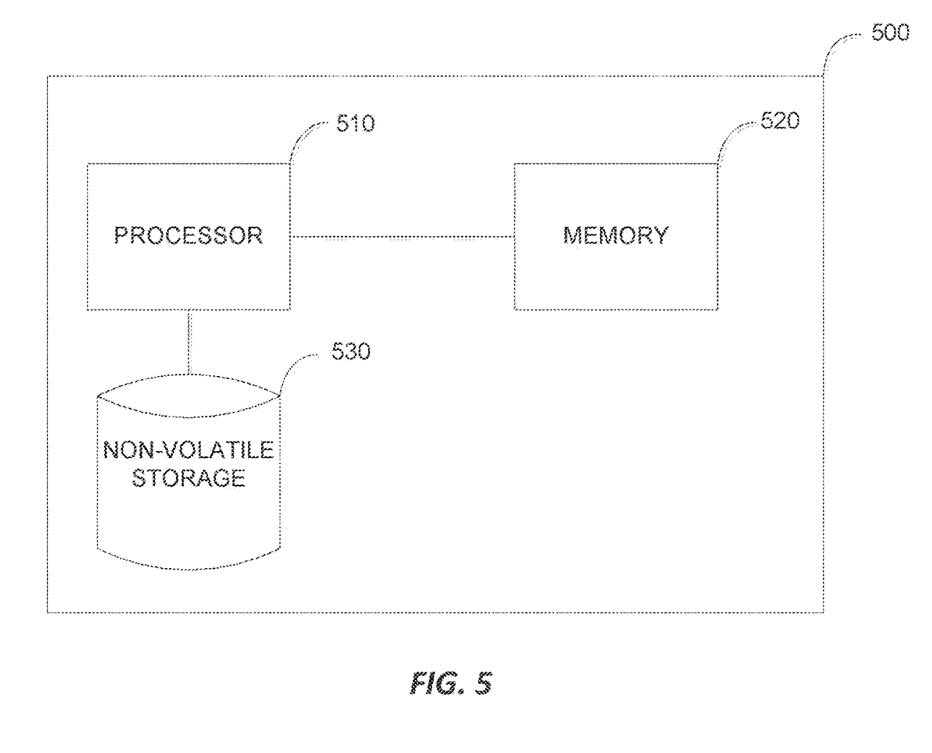
FIG. 5 illustrates an exemplary computer system on which techniques described herein may be performed.

An illustrative implementation of a computer system 500 that may be used in connection with any of the embodiments of the disclosure provided herein is shown in FIG. 5, for example, to implement any of the techniques described herein. The computer system 500 may include one or more processors 510 and one or more articles of manufacture that comprise non-transitory computer-readable storage media (e.g., memory 520 and one or more non-volatile storage media 530). The processor 510 may control writing data to and reading data from the memory 520 and the non-volatile storage device 530 in any suitable manner, as the aspects of the disclosure provided herein are not limited in this respect. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

To perform functionality and/or techniques described herein, the processor 510 may execute one or more instructions stored in one or more computer-readable storage media (e.g., the memory 520, storage media, etc.), which may serve as non-transitory computer-readable storage media storing instructions for execution by processor 510. Computer system 500 may also include any other processor, controller or control unit needed to route data, perform computations, perform I/O functionality, etc. For example, computer system 500 may include any number and type of input functionality to receive data and/or may include any number and type of output functionality to provide data, and may include control apparatus to perform I/O functionality. For example, processor 415 and/or processor 425 and computer readable medium 435 may be implemented by computer system 500.

Processor 510 may execute any one or combination of programs that are available to the processor by being stored locally on computer system 500 or accessible over a network. Any other software, programs or instructions described herein may also be stored and executed by computer system 500. Computer system 500 may be the computer system on a mobile device. Computer system 500 may also be implemented as a standalone computer, server, part of a distributed computing system, and may be connected to a network and capable of accessing resources over the network and/or communicate with one or more other computers connected to the network (e.g., computer system 500 may be part of the network resources available to a voice response system implemented on a mobile device).

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of enabling wake-up word detection in a target language on a user device, the method comprising:
   receiving acoustic input of a user speaking a wake-up word in the target language when the user device is in a low-power mode;
   providing acoustic features derived from the acoustic input to an acoustic model stored on the user device to obtain a first sequence of speech units corresponding to the wake-up word spoken by the user in the target language, the acoustic model trained on a corpus of training data in a source language different than the target language;
   comparing the first sequence of speech units with a reference sequence of speech units to recognize the wake-up word in the target language, wherein the reference sequence of speech units is obtained by applying acoustic features derived from audio comprising the user speaking the wake-up word in the target language to the acoustic model;
   responsive to recognizing the wake-up word, transitioning the user device from the low-power mode to an active mode; and
   adapting the acoustic model to the user using both the reference sequence of speech units and the first sequence of speech units.

2. The method of claim 1, further comprising adapting the acoustic model to the user using the acoustic input of the user speaking the wake-up word in the target language and the sequence of speech units obtained therefrom via the acoustic model.

3. The method of claim 1, wherein the sequence of speech unit comprises a phoneme sequence corresponding to the wake-up word spoken by the user in the target language.

4. The method of claim 1, further comprising associating at least one task with the wake-up word to be performed when it is determined that the user has spoken the wake-up word.

5. A user device configured to enable wake-up word detection in a target language, the user device comprising:
   at least one microphone configured to obtain acoustic information from an environment of the user device;
   at least one computer readable medium storing an acoustic model trained on a corpus of training data in a source language different than the target language; and
   at least one processor coupled to the at least one computer readable medium and programmed to perform:
      receiving, from the at least one microphone, acoustic input from the user speaking a wake-up word in the target language when the user device is in a low-power mode;
      providing acoustic features derived from the acoustic input to the acoustic model to obtain a sequence of speech units corresponding to the wake-up word spoken by the user in the target language;
      comparing the sequence of speech units to a reference sequence of speech units, wherein the reference sequence of speech units obtained by applying acoustic features derived from audio comprising the user speaking the wake-up word in the target language to the acoustic model; and
      adapting the acoustic model to the user using the sequence of speech units and the reference sequence of the speech units.

6. The user device of claim 5, further comprising adapting the acoustic model to the user using the acoustic input of the user speaking the wake-up word in the target language and the sequence of speech units obtained therefrom via the acoustic model.

7. The user device of claim 5, wherein the sequence of speech units comprises a phoneme sequence corresponding to the wake-up word spoken by the user in the target language.

8. The user device of claim 5, further comprising associating at least one task with the wake-up word to be performed when it is determined that the user has spoken the wake-up word in the target language.

9. A method of performing wake-up word detection on a user device, the method comprising:
   while the user device is operating in a low-power mode:
      receiving acoustic input from a user speaking in a target language;
      providing acoustic features derived from the acoustic input to an acoustic model stored on the user device to obtain a first sequence of speech units corresponding to the acoustic input, the acoustic model trained on a corpus of training data in a source language different than the target language;
      determining if the user spoke the wake-up word at least in part by comparing the first sequence of speech units to a reference sequence of speech units stored on the user device, wherein the reference sequence of speech units obtained by applying acoustic features derived from audio comprising the user speaking the wake-up word in the target language to the acoustic model;
      exiting the low-power mode if it is determined that the user spoke the wake-up word; and
      adapting the acoustic model to the user using both the reference sequence of speech units and the first sequence of speech units.

10. The method of claim 9, wherein the acoustic model was adapted to the user using the audio comprising the user speaking the wake-up word in the target language and the reference sequence of speech units obtained therefrom via the acoustic model.

11. The method of claim 9, further comprising performing at least one task associated with the wake-up word if it is determined that the user spoke the wake-up word.

12. The method of claim 9, wherein the first sequence of speech units comprises a phoneme sequence corresponding to the acoustic input, and wherein the reference sequence of speech units comprises a phoneme sequence corresponding to the user speaking the wake-up word in the target language.

13. The method of claim 9, wherein exiting the low-power mode comprises transitioning the user device from an idle mode to an active mode.

* * * * *